United States Patent [19]

Matsumura et al.

[11] Patent Number: 5,464,689
[45] Date of Patent: Nov. 7, 1995

[54] RESIN COMPOSITION, POROUS FILM PRODUCED THEREFROM AND PROCESS FOR PRODUCING SAME

[75] Inventors: Hiroshi Matsumura, Fukuroi; Takaaki Shimada, Kagawa; Takayuki Hisanaka, Kakegawa; Yoshiki Ochi; Tetsuo Kuwaki, both of Tokuyama; Yoshinobu Muta, Urayasu, all of Japan

[73] Assignees: Uni-Charm Corporation, Kawanoe; Tokuyama Corporation, Yamaguchi, both of Japan

[21] Appl. No.: 260,446

[22] Filed: Jun. 14, 1994

[30] Foreign Application Priority Data

Jun. 15, 1993 [JP] Japan ................................ 5-143767

[51] Int. Cl.$^6$ .................................................... C08L 67/04
[52] U.S. Cl. ......................... 428/317.9; 264/210.1; 264/210.6; 524/539; 525/450
[58] Field of Search ........................ 524/539; 525/411; 428/317.9; 269/210.6, 210.1

[56] References Cited

U.S. PATENT DOCUMENTS 5,124,371  6/1992  Tokiwa .......................... 525/411

FOREIGN PATENT DOCUMENTS 3-157450  7/1991  Japan .
4-146952  5/1992  Japan .

*Primary Examiner*—Patricia A. Short
*Attorney, Agent, or Firm*—Armstrong, Westerman, Hattori, McLeland & Naughton

[57] ABSTRACT

A resin composition which comprises 95 to 60 volume % of a resin mixture of 40 to 85% by weight of a copolymer between D-hydroxybutyrate and D-hydroxyvalerate containing 8 to 15 mol % of D-hydroxyvalerate-derived monomer unit and 60 to 15% by weight of poly-ε-caprolactone, and 5 to 40 volume % of an inorganic filler or fillers, a porous film produced from the resin composition and having a void volume of 10 to 70%, and a process for producing the porous film are disclosed. The film can be produced by melting the resin composition, forming it into a film, and stretching the film in at least one direction. The porous film can easily be degraded by microorganisms. Examples of the inorganic filler include barium sulfate, with the particle size being preferably 0.1 to 10.0 μm.

3 Claims, No Drawings

RESIN COMPOSITION, POROUS FILM PRODUCED THEREFROM AND PROCESS FOR PRODUCING SAME

BACKGROUND OF THE INVENTION

This invention relates to a resin composition, a porous film which is produced from the composition and is readily degraded by microorganisms under natural conditions, and a process for producing the film.

Porous films produced by compounding a polyolefin resin such as polyethylene or polypropylene resin with an inorganic filler or fillers such as calcium carbonate or barium sulfate, melting and filming the mixture, then stretching the resulting film have been used in many fields as various wrapping materials, medical supplies, clothing materials, etc. However, plastics represented by polyolefin resins are chemically so stable that used plastic products will keep their shape over a long period of time when left under natural conditions. In addition, they will become voluminous waste for their weight due to the low density of the plastics. Thus, disposal of used plastic products have become a serious object of public concern.

On the other hand, it has been conducted to mix an organic substance such as starch in polymers for the purpose of solving the problem of disposal of used plastic products. However, the resins themselves are not degraded, though the organic substance such as starch is degraded and the plastic products lose their shape. Hence, this technique of mixing the organic substance fails to completely solve the problem of disposal of used plastic products.

As plastics which are biodegradable by microorganisms such as bacteria and molds, there are illustrated chemically synthesized aliphatic polyester resins represented by poly-ε-caprolactone and aliphatic polyesters yielded by microorganisms such as a polyhydroxybutyrate polymer and a copolymer between hydroxybutyrate and hydroxyvalerate.

However, these biodegradable resins have the defects of low melting points, poor workability, expensiveness, etc. In order to improve their workability, it has been proposed to blend polyhydroxybutyrate with poly-ε-caprolactone (Japanese Unexamined Patent Publication No. H3-157450) or to add a filler such as calcium carbonate or starch to the aliphatic polyester to thereby control degradation rate or decrease the price (Japanese Unexamined Patent Publication No. H4-146952).

As to the former blending technique, however, only polyhydroxybutyrate is disclosed as a resin component to be mixed with poly-ε-caprolactone, as described above, and it is not disclosed to blend with a copolymer between hydroxybutyrate and hydroxyvalerate. As to the latter filler-adding technique, only polyhydroxybutyrate, poly-ε-caprolactone, etc. are disclosed as the aliphatic polyesters, and it is not disclosed, either, to use a copolymer between hydroxybutyrate and hydroxyvalerate.

In addition, the two techniques disclose using such resin compositions merely as materials for producing moldings of various shapes, and it is not disclosed to use the compositions as materials for producing porous films. In fact, the resin compositions are insufficient as materials for producing porous films due to their poor elongation upon filming and poor heat resistance.

SUMMARY OF THE INVENTION

It is, therefore, an object of the present invention to provide a resin composition which can be formed into a porous film capable of maintaining good appearance, good feeling and good properties such as mechanical strength and heat resistance when in use and, after disposal, easily degraded by microorganisms.

Another object of the present invention is to provide a porous film molded from the resin composition.

A further object of the present invention is to provide a process for producing the porous film.

Other objects, features and advantages of the present invention will become apparent from the detailed description of the preferred embodiments of the present invention to follow.

In order to attain the above-described objects, the inventors have made intensive investigations on films which, when in use, exhibit properties adapted for a particular use and, after being used and left in the nature, can easily be degraded by microorganisms such as bacteria and mold into water and carbonic acid gas in a short time, thus imposing less load on the environment. As a result, the inventors have found that the above-described objects can be attained by using a novel resin composition comprising a resin mixture of specific aliphatic polyesters and an inorganic filler or fillers, thus having completed the present invention based on the finding.

That is, according to one aspect of the present invention, there is provided a resin composition which comprises 95 to 60 volume % of a resin mixture of 40 to 85% by weight of a copolymer between D-hydroxybutyrate and D-hydroxyvalerate containing 8 to 15 mol % of D-hydroxyvalerate-derived monomer unit and 60 to 15% by weight of poly-ε-caprolactone and 5 to 40 volume % of an inorganic filler or fillers.

According to another aspect of the present invention, there is provided a porous film produced from the resin composition which comprises 95 to 60 volume % of a resin mixture of 40 to 85% by weight of a copolymer between D-hydroxybutyrate and D-hydroxyvalerate containing 8 to 15 mol % of D-hydroxyvalerate-derived monomer unit and 60 to 15% by weight of poly-ε-caprolactone and 5 to 40 volume % of an inorganic filler or fillers, and having a void volume of 10 to 70%.

DETAILED DESCRIPTION OF THE PREFERRED EMBODIMENTS OF THE INVENTION

The polymer between D-hydroxybutyrate and D-hydroxyvalerate to be used in the present invention (hereinafter abbreviated as "PHB-HV") is not particularly limited as long as it contains 8 to 15 mol % of D-hydroxyvalerate-derived monomer unit.

In general, those yielded within the body of microorganisms. Additionally, both hydroxybutyrate and hydroxyvalerate must be D-isomers. If L-isomers of the above-described compounds are used as monomer components of the copolymer, there results a copolymer having no biodegradability.

PHB-HV shows lower melting point and a more flexibility as the content of D-hydroxyvalerate increases. If the content of the D-hydroxyvalerate-derived monomer unit is less than 8%, PHB-HV loses elongation properties so much that addition of poly-ε-caprolactone (hereinafter abbreviated as "PCL") fails to sufficiently improve elongation, thus the resulting resin composition being difficult to form a porous structure.

On the other hand, if the content of the D-hydroxyvalerate-derived monomer unit exceeds 15 mol %, there results a film having insufficient breaking strength, breaking extension and secondary workability, though the composition can be made porous without adding PCL PHB-HV is not particularly limited as to molecular weight but, in view of molding properties, workability to form into a porous film and mechanical strength, PHB-HV having a molecular weight of 300,000 or more, particularly 600,000 or more, in terms of weight-average moleclar weight is preferred. PHB-HV having a molecular weight of less than 300,000 in terms of weight-average moleclar weight has such a low melt viscosity that it is difficult to mold.

The above-described PHB-HV containing 8 to 15 mol % of D-hydroxyvalerate-derived monomer unit itself has a low elongation and is difficult to stretch to form a porous film in the presence of a filler. In the present invention, the PHB-HV is blended with a specific amount of poly-ε-caprolactone to obtain a resin composition which has improved elongation and, therefore, shows good workability upon being stretched to form a porous film.

PCL is a flexible resin having a large elongation. PCL serves to improve the workability of the resin composition of the present invention as described above due to its excellent workability. As to the blending proportion of PCL and PHB-HV, the amount of PCL is 15 to 60% by weight. If the amount of PCL is less than 15% by weight, PCL fails to sufficiently improve elongation of the resulting resin composition, thus stretching of the resin composition to form a porous film becomes difficult. On the other hand, if the amount of PCL exceeds 60% by weight, the resulting resin composition has a deteriorated heat resistance due to the considerably low melting point of PCL (60° C.), and has limited uses.

PCL is not particularly limited as to number-average molecular weight but, in view of molding properties upon being molded into a film, workability to form a porous film, and mechanical strength, PCL having a number-average molecular weight of 40,000 or more, more preferably 700,000 or more, is preferably used.

As is described above, in the case of producing porous films from the resin composition of the present invention, it is necessary that the content of D-hydroxyvalerate-derived monomer unit in the PHB-HV be 8 to 15 mol % and that the content of the PCL in the resin composition be 15 to 60% by weight for obtaining a flexible porous film with good workability by stretching technique.

In the present invention, inorganic fillers are used for preventing deterioration of heat resistance due to addition of PLC and for making the stretched film porous. Deterioration of heat resistance can be prevented by properly jutting the filler out of the film surface to form proper unevenness on the film surface for decreasing area of contact between films.

As the inorganic fillers, one or more oxides, hydroxides, carbonates, sulfates, etc. of metals selected from the group consisting of the group IIA metals, IIIB metals and IVA metals in the periodic table. For example, the group IIA metals include alkaline earth metals such as calcium, magnesium and barium, the group IIIB metals include boron and aluminum, and the group IVA metals include titanium, zirconium and hafnium.

Oxides, hydroxides, carbonates or sulfates may be used without particular limitation. Specific examples of particularly preferred inorganic fillers include oxides such as calcium oxide, magnesium oxide, barium oxide, aluminum oxide, boron oxide, titanium oxide and zirconium oxide; carbonates such as calcium carbonate, magnesium carbonate and barium carbonate; hydroxides such as magnesium hydroxide, calcium hydroxide and aluminum hydroxide; sulfates such as calcium sulfate, barium sulfate and aluminum sulfate; etc.

Polyester resins easily undergo hydrolysis under acidic or alkaline condition, resulting in deterioration of strength and elongation. In order to prevent the hydrolysis, the fillers are preferably neutral. In addition, for the purpose of effectively obtaining porous film by stretching, the fillers are preferably of shape having a definite thickness such as spherical or columnar shape. In view of these conditions, spherical or columnar barium sulfate particles are preferably used as the inorganic filler.

These inorganic fillers may be subjected, if necessary, to a surface treatment with a water-repellent surface treating agent before use. As the water-repellent surface treating agent, siloxane series surface treating agents, silane series surface treating agents, etc. are preferably used. Preferred examples of the siloxane series surface treating agents are modified polysiloxanes such as amino-, epoxy- or carboxyl-modified polysiloxanes. Preferred examples of the silane series surface treating agents are monoalkylsilanes represented by the following general formula:

$$SiRX_3$$

wherein R represents a straight-chain alkyl group containing 1 to 30 carbon atoms and preferably being partly substituted by fluorine atom or atoms such as $CF_3(CH_2)_4-$, and X represents an alkoxy group, a halogen atom such as a chlorine atom or bromine atom or an amino group.

The inorganic fillers to be used in the present invention are not particularly limited as to average particle size but, for the purpose of attaining good dispersibility in film and jutting the filler particles out of the film surface to form proper unevenness on the film surface, the fillers preferably have an average particle size of at least 0.1 μm, more preferably at least 1.0 μm. On the other hand, in order to keep surface smoothness of the film, the fillers preferably have an average particle size of up to 10.0 μm, more preferably up to 7 μm.

In forming a porous film having a thickness of up to 50 μm, fillers having an average particle size of up to 4 μm are particularly preferred.

As to blending proportion of PCL, PHB-HV and the inorganic filler, proportion of the resin mixture of PCL and PHB-HV is 95 to 60 volume %, and that of the inorganic filler is 5 to 40 volume %. If the proportion of the inorganic filler is less than 5 volume %, uniform interfacial parting between the resin phase of PCL and PHB-HV and the inorganic filler particles does not take place, thus a porous film with a uniform thickness and sufficient porosity is not obtained. The resulting film has only a small surface area and, therefore, its degradation rate is not increased. In addition, it has insufficient gas permeability and moisture permeability, though ordinary porous films have good permeability and moisture permeability. On the other hand, if the proportion of the inorganic filler exceeds 40% by volume, it becomes difficult to form the blend into a film by means of, for example, an extruder, thus such proportion is not preferred.

In the case of producing a porous film from the above-described resin composition composed of PHB-HV, PCL and the inorganic filler, void volume of the film must be 10 to 70%. If the void volume is less than 10%, voids formed around the inorganic filler particles are not connected to each other, and open cells or continuous pores connecting from one surface to the other surface of the film are not formed. Therefore, the surface area of the fim is not increased, and its degradation rate is not increased. In addition, such film has insufficient gas permeability and moisture permeability, though ordinary porous films have good permeability and moisture permeability.

On the other hand, if the void volume exceeds 70%, there results a film having insufficient mechanical strength. With such film, there arises problems of film rupture during processing steps or breakage in use. In particular, in order to obtain sufficient mechanical strength and biodegradability of the film, the void volume is preferably 25 to 65%.

In view of biodegradability, the porous film preferably has many fine pores. That is, maximum pore size (hereinafter also referred to as "Dmax" measured according to the methanol-bubbling method is preferably up to 10 μm, more preferably up to 5 μm. Thickness of the film of the present invention is generally 0.03 to 15 mm so as to obtain sufficient mechanical strength and sufficient flexibility.

In addition, the porous film of the present invention has gas permeability due to the presence of open cells or continuous pores connecting from one surface to the other surface of the film. Gas permeability is usually in the range of from 100 to 10,000 sec/100 cc, which is suitable for the uses to be described hereinafter. Gas permeability closely relates to the void volume and, the larger the void volume, the larger the gas permeability.

In the present invention, any method may be employed for producing the porous film from the resin composition composed of PHB-HV, PCL and the inorganic fillers.

Specifically, a resin composition composed of 40 to 85% by weight of a copolymer between D-hydroxybutyrate and D-hydroxyvalerate containing 8 to 15 mol % of D-hydroxyvalerate-derived monomer unit and 60 to 15% by weight of poly-ε-caprolactone and 5 to 40% by volume of an inorganic filler or fillers is molten and filmed and stretching the resulting film in at least one direction.

PHB-HV, PCL and the filler are blended in a known manner, for example, by using a Henschel mixer. In molding into a sheet, an inflation molding method or an extrusion molding method using a T-die is preferably employed. In the subsequent stretching step, the sheet is stretched in at least one direction using a known stretching machine such as a tentering machine or an air inflation stretching machine. In the case of conducting biaxial stretching, stretching in a longitudinal direction and stretching in a lateral direction may be conducted successively or simultaneously. As to the stretching conditions, stretching temperature is ordinary temperature to the melting point of used aliphatic polyester resin, stretch ratio is 1.3 to 3.0 times in the longitudinal and lateral directions. Such stretching conditions are preferred for attaining excellent strength properties, moisture permeability and water resistance. In general, the stretched film may be subjected to surface treatment such as heat treatment or corona discharge treatment.

The porous film obtained from the resin composition of the present invention has much better biodegradability than non-porous films obtained from a similar composition. Specifically, when dipped in a solution of a degrading enzyme, the porous film of this invention showed a weight-decreasing rate about 1.5 times as fast as the non-porous film. This may be attributed to the porous structure formed by interfacial parting between the resin phase of PCL and PHB-HV and the inorganic filler particles, which serves to increase the surface area and therefore the contact area with the degrading enzyme, with degradation proceeding from inside as well as from outside.

The porous film shows excellent mechanical properties, workability and heat resistance when in use and, after being used, it shows excellent biodegradability in the natural environment, thus being disposable by reclamation.

The film can be suitably used as a film for agricultural use, a back sheet for paper diaper, wrapping material, and a disposable material such as simple clothing, a sheet for medical use, clothing for medical use and medical supplies.

The present invention is now described in more detail by reference to examples which, however, are not construed to be limitative at all.

Additionally, physical properties shown in Examples and Comparative Examples to be described hereinafter were measured according to the following methods.

(1) <VOID VOLUME>

Void volume was measured according to the specific gravity-measuring method.

$$\text{Void volume (\%)} = \frac{d_0 - d_1}{d_0} \times 100$$

$d_o$: specific gravity of film before being rendered porous
$d_1$: specific gravity of film after being rendered porous (2) <MAXIMUM PORE SIZE>

(hereinafter abbreviated as Dmax)
Dmax was measured by the methanol bubble point method.

(3) <TENSLE STRENGTH TENSILE ELONGATION>

Measured according to ASTM-882.

Additionally, MD in Table 1 means the direction of winding the film, and TD means the direction at right angles with the direction of winding the film.

(4) <GAS PERMEABILITY>

Gas permeability was measured according to JIS-P-8117 (Gurley gas permeability).

(5) <EVALUATION OF DEGRADATION RATE>

3 mg of lipase was dissolved in 1 liter of a 0.04N phosphate buffer solution. 100 mg of a film to be tested was dipped in this aqueous solution, and degradation rate of the film was evaluated in terms of weight loss in a 37° C. oven. In view of the amount of filler particles used, the degradation rate was presented in terms of the weigt loss (mg) of the resin component at a stage 3 times after initiation of the degradation.

(6) <HEAT RESISTANCE>

Two films were placed one upon another in an atmosphere of 60° C., and a load of 20 g/cm$^2$ was applied to the two films. The fused strength between the two films was measured with a width of 25 mm. Sample films showing a fused strength of less than 5 g were evaluated as ○, sample films showing a fused strength of 5 to 20 g as Δ, and sample films showing a fused strength of more than 20 g as X.

In the following Examples and Comparative Examples, "Placcel -H7" (trade name; made by Daisel Kagaku K.K.; number average molecular weight: 80,000) was used as PCL. "Biopole" (trade name; made by I.C.I.) was used as PHB-HV.

Additionally, the number-average molecular weight of the resin component was measured by first dissolving in chloroform and subjecting the resulting solution to gel permeation chromatograph at 40° C. The molecular weight was determined as a polystyrene conversion.

As the siloxane series surface treating agent, "KPN-3504" (made by Shin'etu Silicone K.K.) represented by the following formula (1) was used. The surface treating agent was added in an amount of 1.0 part by weight per 100 parts by weight of the inorganic filler.

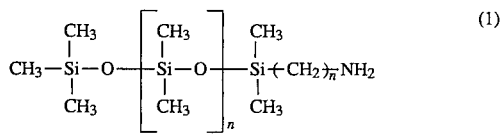 (1)

Each of the resin composition shown in Table 1 was blended for 5 minutes in a super-mixer, extruded in a strand form at 180° C. using a biaxial extruder, then cut into pellets.

The thus obtained pellets were loaded in an extruder of 30 mm in screw diameter and 24 in L/D having a T-die of 0.8 mm in lip opening and 150 mm in width, extruded through the die at 180° C., and brought into contact with a cooling roll of 100 mm in diameter inside of which 30° C. water was circulated, and taken up at a speed of 0.8 m/min to obtain a sheet. This sheet was monoaxially stretched at 50° C. with a stretch ratio of 1.5 to 2.5 times between two pairs of heated nip rolls rotating at different speeds. The monoaxially stretched film was again stretched at 50° C. in a direction at right angles with the first stretching direction with a stretch ratio of 2.0 times using a tenter to obtain a 40-μm thick porous film. Physical properties and biodegradability of the resulting films are tabulated in Table 2.

Additionally, in Tables 1 and 2, sample Nos. 11 and 16 are Comparative Examples.

TABLE 1

| | Resin | | | | | Inorganic Filler | |
|---|---|---|---|---|---|---|---|
| | PHB-HV | | | | | | |
| No. | wt % | HV mol % | Weight-average m.w. | PCL wt % | Kind | Particle Size, μm | Volume % |
| 1 | 80 | 9 | 740,000 | 20 | BaSO$_4$ | 2 | 20 |
| 2 | 80 | 12 | 780,000 | 20 | BaSO$_4$ | 2 | 20 |
| 3 | 80 | 14 | 740,000 | 20 | BaSO$_4$ | 2 | 20 |
| 4 | 60 | 12 | 780,000 | 40 | BaSO$_4$ | 2 | 20 |
| 5 | 45 | 12 | 780,000 | 55 | BaSO$_4$ | 2 | 20 |
| 6 | 80 | 12 | 780,000 | 20 | BaSO$_4$ | 2 | 7 |
| 7 | 80 | 12 | 780,000 | 20 | BaSO$_4$ | 1 | 20 |
| 8 | 80 | 12 | 780,000 | 20 | BaSO$_4$ | 2 | 35 |
| 9 | 80 | 12 | 780,000 | 20 | BaSO$_4$ | 6 | 20 |
| 10 | 80 | 12 | 780,000 | 20 | CaCO$_3$ | 2 | 20 |
| 11 | 100 | 12 | 780,000 | 0 | BaSO$_4$ | 2 | 20 |
| 12 | 100 | 20 | 680,000 | 0 | BaSO$_4$ | 2 | 20 |
| 13 | 30 | 12 | 780,000 | 70 | BaSO$_4$ | 2 | 20 |
| 14 | 80 | 6 | 700,000 | 20 | BaSO$_4$ | 2 | 20 |
| 15 | 80 | 12 | 780,000 | 20 | BaSO$_4$ | 2 | 3 |
| 16 | 80 | 12 | 780,000 | 20 | BaSO$_4$ | 2 | 45 |

TABLE 2

| No. | Gas Permeability, SEC/100 cc | Void Volume % | Breaking Strength MD | Breaking Strength TD | Breaking Elongation MD | Breaking Elongation TD | Dmax um | Degradation rate, mg/3 hr | Heat Resistance, g/25 mm |
|---|---|---|---|---|---|---|---|---|---|
| 1 | 900 | 45 | 1.15 | 0.85 | 140 | 120 | 2.0 | 20 | ○ |
| 2 | 1000 | 43 | 1.10 | 0.83 | 170 | 160 | 2.0 | 20 | ○ |
| 3 | 1200 | 40 | 1.05 | 0.80 | 250 | 200 | 1.8 | 18 | ○ |
| 4 | 1000 | 42 | 0.95 | 0.75 | 250 | 250 | 1.9 | 20 | Δ |
| 5 | 1200 | 45 | 1.32 | 0.90 | 310 | 300 | 2.2 | 21 | Δ |
| 6 | 2500 | 30 | 1.45 | 1.30 | 200 | 180 | 1.5 | 17 | ○ |
| 7 | 800 | 47 | 1.20 | 1.00 | 140 | 100 | 1.7 | 26 | ○ |
| 8 | 500 | 58 | 1.10 | 0.90 | 110 | 80 | 2.6 | 26 | ○ |
| 9 | 600 | 50 | 1.10 | 0.90 | 140 | 110 | 3.0 | 24 | ○ |
| 10 | 1000 | 45 | 1.05 | 0.80 | 160 | 150 | 2.0 | 21 | ○ |
| 11 | | | | unable to be rendered porous by stretching | | | | | |

TABLE 2-continued

| No. | Gas Permeability, SEC/100 cc | Void Volume % | Breaking Strength MD | Breaking Strength TD | Breaking Elongation MD | Breaking Elongation TD | Dmax um | Degradation rate, mg/3 hr | Heat Resistance, g/25 mm |
|---|---|---|---|---|---|---|---|---|---|
| 12 | 800 | 45 | 0.95 | 0.75 | 80 | 60 | 2.0 | 20 | ○ |
| 13 | 800 | 43 | 1.15 | 0.95 | 350 | 350 | 1.9 | 19 | X |
| 14 | unable to be rendered porous by stretching | | | | | | | | |
| 15 | | 6 | 1.45 | 1.30 | 18 | 1 | — | 12 | ○ |
| 16 | unable to be formed into film | | | | | | | | |

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. A resin composition which comprises of 95 to 60 volume % of a resin mixture of 40 to 85% by weight of a copolymer between D-hydroxybutyrate and D-hydroxyvalerate containing 8 to 15 mol % of D-hydroxyvalerate-derived monomer unit and 60 to 15% by weight of poly-ε-caprolactone, and 5 to 40 volume % of an inorganic filler or fillers.

2. A porous film which comprises of 95 to 60 volume % of a resin mixture of 40 to 85% by weight of a copolymer between D-hydroxybutyrate and D-hydroxyvalerate containing 8 to 15 mol % of D-hydroxyvalerate-derived monomer unit and 60 to 15% by weight of poly-ε-caprolactone, and 5 to 40 volume % of an inorganic filler or fillers, and having a void volume of 10 to 70% measured in accordance with the formula $$\text{void volume (\%)} = \frac{d_0 - d_1 \times 100}{d_0}$$

wherein $d_0$ is the specific gravity of film before being rendered porous, and $d_1$ is the specific gravity of film after being rendered porous.

3. A process for producing a porous film described in claim 2, which comprises melting a resin composition which comprises of 95 to 60 volume % of a resin mixture of 40 to 85% by weight of a copolymer between D-hydroxybutyrate and D-hydroxyvalerate containing 8 to 15 mol % of D-hydroxyvalerate-derived monomer unit and 60 to 15% by weight of poly-ε-caprolactone, and 5 to 40 volume % of an inorganic filler or fillers, forming it into a film, and stretching the resulting film in at least one direction.

* * * * *